United States Patent [19]

Arnaudeau et al.

[11] 4,270,611
[45] Jun. 2, 1981

[54] MOORING STATION AND TRANSFER TERMINAL FOR OFFSHORE HYDROCARBON PRODUCTION

[75] Inventors: Marcel Arnaudeau; Pietrus Verschure, both of Paris, France

[73] Assignee: Institut Francais du Petrole, Rueil-Malmaison, France

[21] Appl. No.: 618

[22] Filed: Jan. 2, 1979

[30] Foreign Application Priority Data

Dec. 30, 1977 [FR] France ................................ 77 39849

[51] Int. Cl.³ ............................................. E21B 7/12
[52] U.S. Cl. .................................... 166/344; 141/387; 9/8 P; 166/366
[58] Field of Search ................ 166/338, 344, 347–357, 166/366; 9/8 P; 137/236; 141/387

[56] References Cited

U.S. PATENT DOCUMENTS

| 3,366,173 | 1/1968 | McIntosh | 166/366 X |
|---|---|---|---|
| 3,503,443 | 3/1970 | Blanding et al. | 166/344 |
| 3,542,125 | 11/1970 | Sizer | 166/366 X |
| 3,545,474 | 12/1970 | Brown | 166/70 X |
| 3,545,489 | 12/1970 | Brown | 166/70 X |
| 3,556,218 | 1/1971 | Talley, Jr. et al. | 166/366 |
| 3,590,407 | 7/1971 | Bratianu | 9/8 P |
| 3,612,177 | 10/1971 | Knizner et al. | 166/366 X |
| 4,015,660 | 4/1977 | Lewis, Jr. | 166/347 |
| 4,052,090 | 10/1977 | Stafford | 9/8 P X |
| 4,121,616 | 10/1977 | Lochte et al. | 141/387 |

*Primary Examiner*—James A. Leppink
*Assistant Examiner*—Richard E. Favreau
*Attorney, Agent, or Firm*—Millen & White

[57] ABSTRACT

A mooring station and transfer terminal for offshore hydrocarbon production comprises a watertight caisson topped by a rotatable arm which supports a pipe for loading oil tankers. The caisson houses manifolds and a T F L (Through Flow Line) switching device connected to the different underwater producing wellheads. A T F L - servicing pipe supported by the rotatable arm and connected to the switching device through a rotary coupling at the top of the caisson permits introduction of T F L tools or instruments from the water surface into a selected well through the switching device.

12 Claims, 6 Drawing Figures

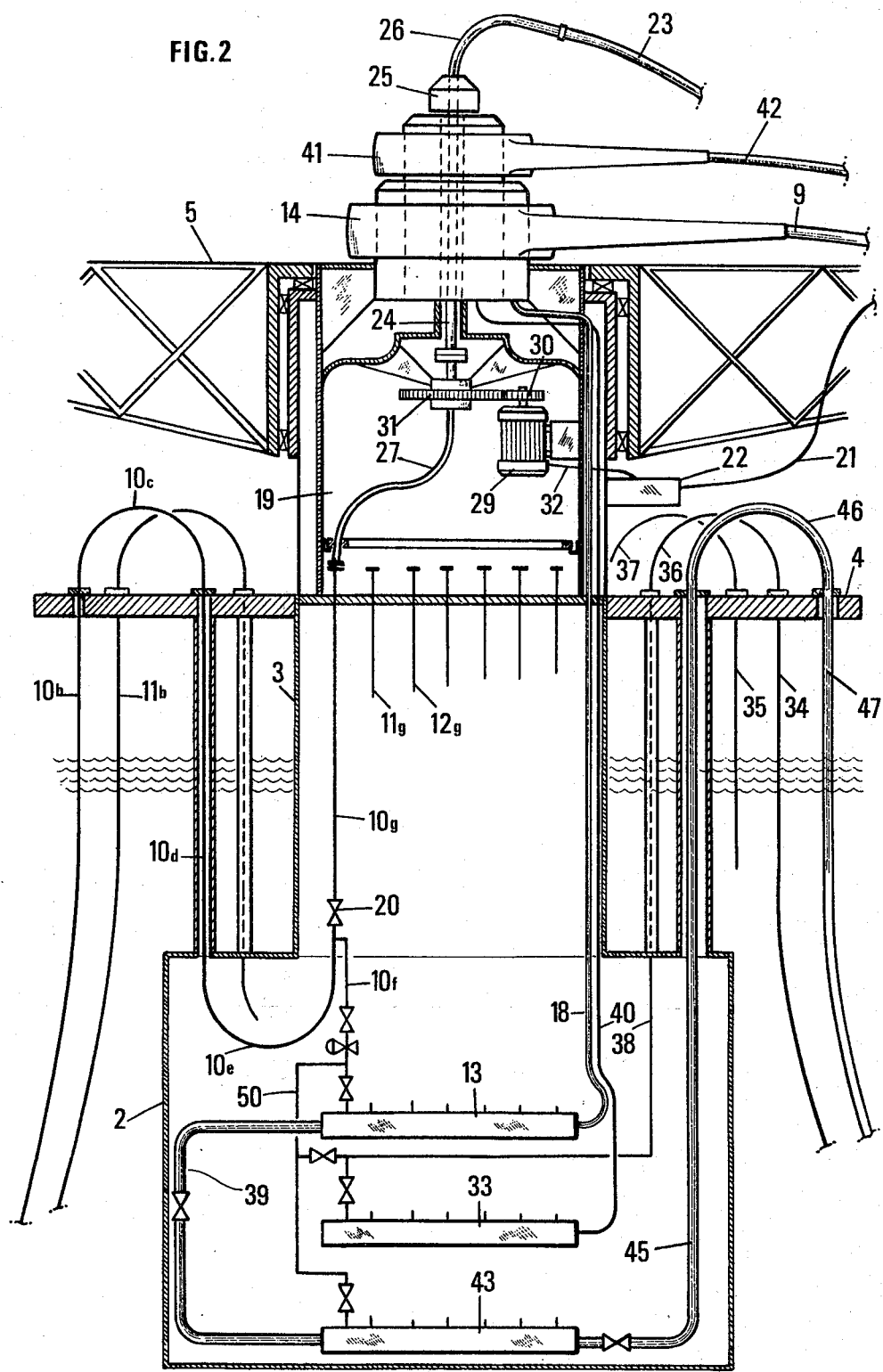

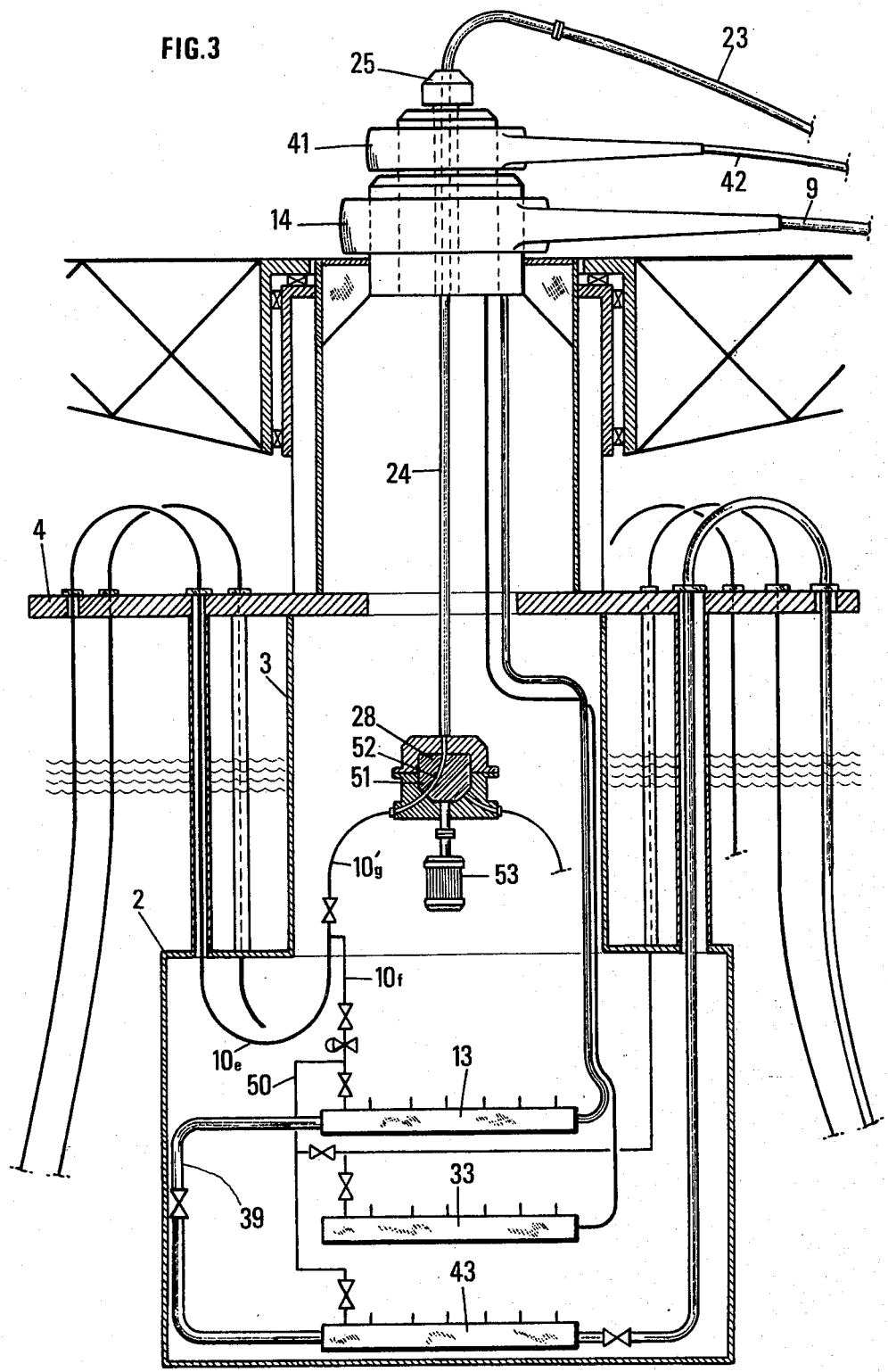

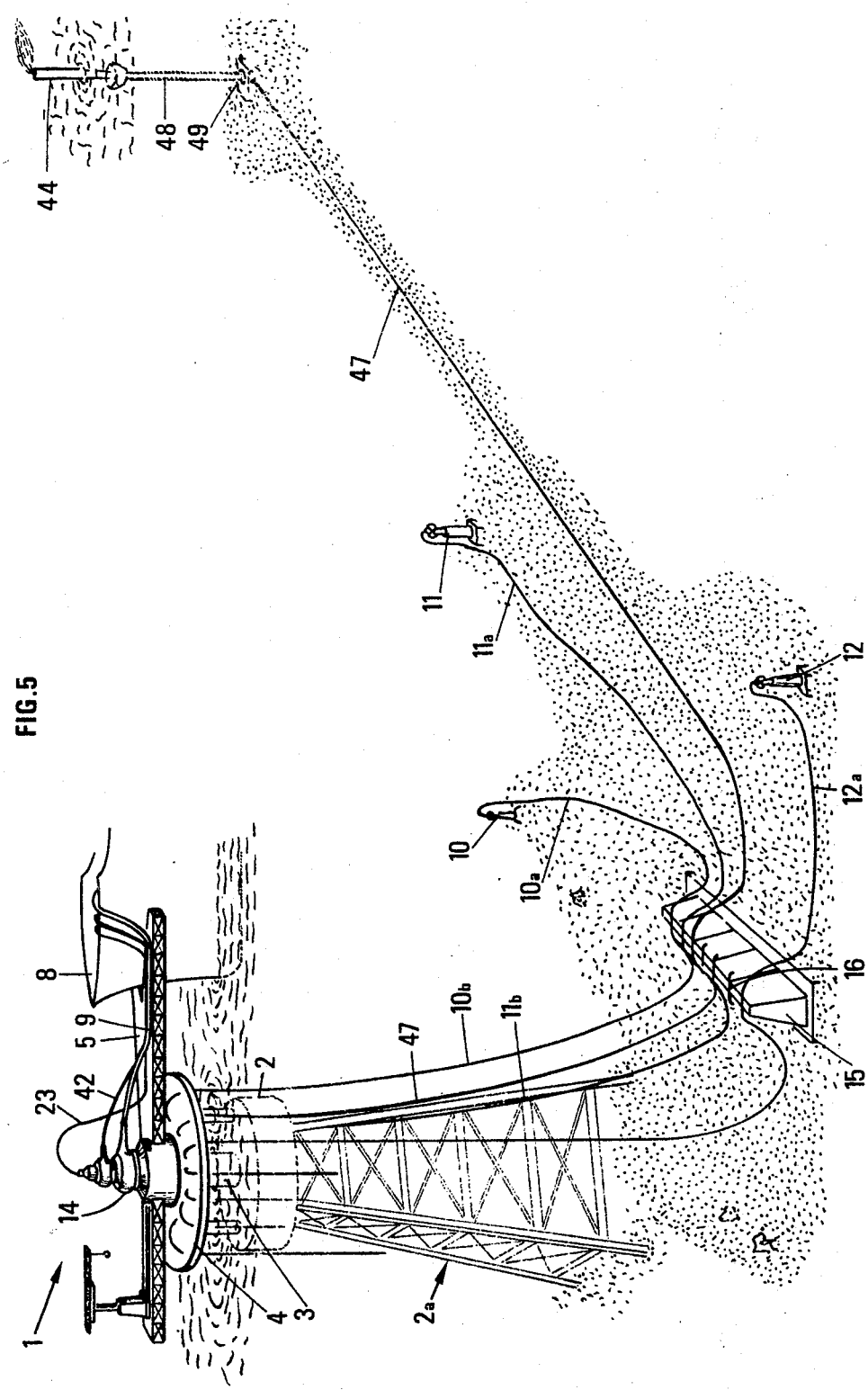

MOORING STATION AND TRANSFER TERMINAL FOR OFFSHORE HYDROCARBON PRODUCTION

The present invention relates to a mooring station and transfer terminal for offshore hydrocarbon production, such terminal permitting mooring of oil processing and transportation ships.

At the present time offshore hydrocarbon production is developing at locations remote from conventional harbours and this, added to the continuous weight increase of oil tankers, leads to building artificial mooring stations for anchoring such tankers during loading operations thereof.

Mooring stations and transfer terminals are already known, such a terminal being connected to a plurality of underwater production wellheads and comprising a caisson topped by a rotatable arm which supports at least one pipe for loading oil tankers.

In these prior devices the different producing wellheads are connected through pipes to a production manifold which rests on the water bottom. This manifold can be connected to the caisson through a gathering line laying on the water bottom and a riser connecting this line to said loading pipe supported by the caisson.

A primary object of the invention is to provide a new hydrocarbon production system whereby maintenance operations performed on the production manifold become easier and less expensive.

An additional object of the invention is to provide an offshore hydrocarbon production system facilitating servicing operations performed on producing underwater wells, more particularly the introduction of tools or instruments into production tubings, by pumping such tools or instruments in a direction opposite to the direction of flow through a production tubing, down to the bottom of a preselected producing well. This pumping process is the well known T F L-method (Through Flow Line).

These and other objects will become readily apparent to those skilled in the art from the study of the specification and the appended claims.

The above objects are achieved according to the invention by using a mooring station and transfer terminal for offshore hydrocarbon production from a plurality of underwater wellheads, this terminal comprising a watertight caisson topped by a rotatable arm supporting a loading pipe and associated with an equipment comprising at least one production manifold connecting the different wells to said loading pipe, at least one circulation and safety manifold connecting the different wells to a circulation and safety line (choke and kill line) common to all the wells, these manifolds being equipped with a valve assembly, and shunting or switching means located in a sealed chamber and enabling a T F L instrument or tool inlet conduit to be connected to a pipe selected from a system of production and T F L servicing pipes, these last-mentioned pipes connecting the different wells both to said shunting means and to said production manifold. The terminal according to the invention is characterized in that the assembly formed by said manifolds and said shunting means is located within said watertight caisson topped by the rotatable arm, said manifolds and said shunting means being connected to the different wells through flexible pipes, and said conduit for introducing T F L tools and said circulation and safety line being supported at the surface by said rotatable arm of the caisson.

As compared to prior art systems wherein the manifolds lie on the water bottom, the terminal according to the invention has the advantage of locating these manifolds in a watertight caisson, i.e. in a dry atmosphere.

This increases the working life of the manifolds and of the electric and hydraulic eqiupments associated therewith, and facilitates maintenance of these equipments.

The terminal according to the invention has the additional advantage of being easily retrievable, so as to be transferred to another production site.

The invention is illustrated by the accompanying drawings, wherein:

FIG. 1 is an overall view of an embodiment of mooring station and transfer terminal according to the invention;

FIG. 2 diagrammatically illustrates the caisson in axial section;

FIG. 3 illustrates another embodiment wherein the shunting means comprises a rotatable drum;

FIG. 5 illustrates a modification of the embodiment illustrated in FIG. 1.

Figure 1:
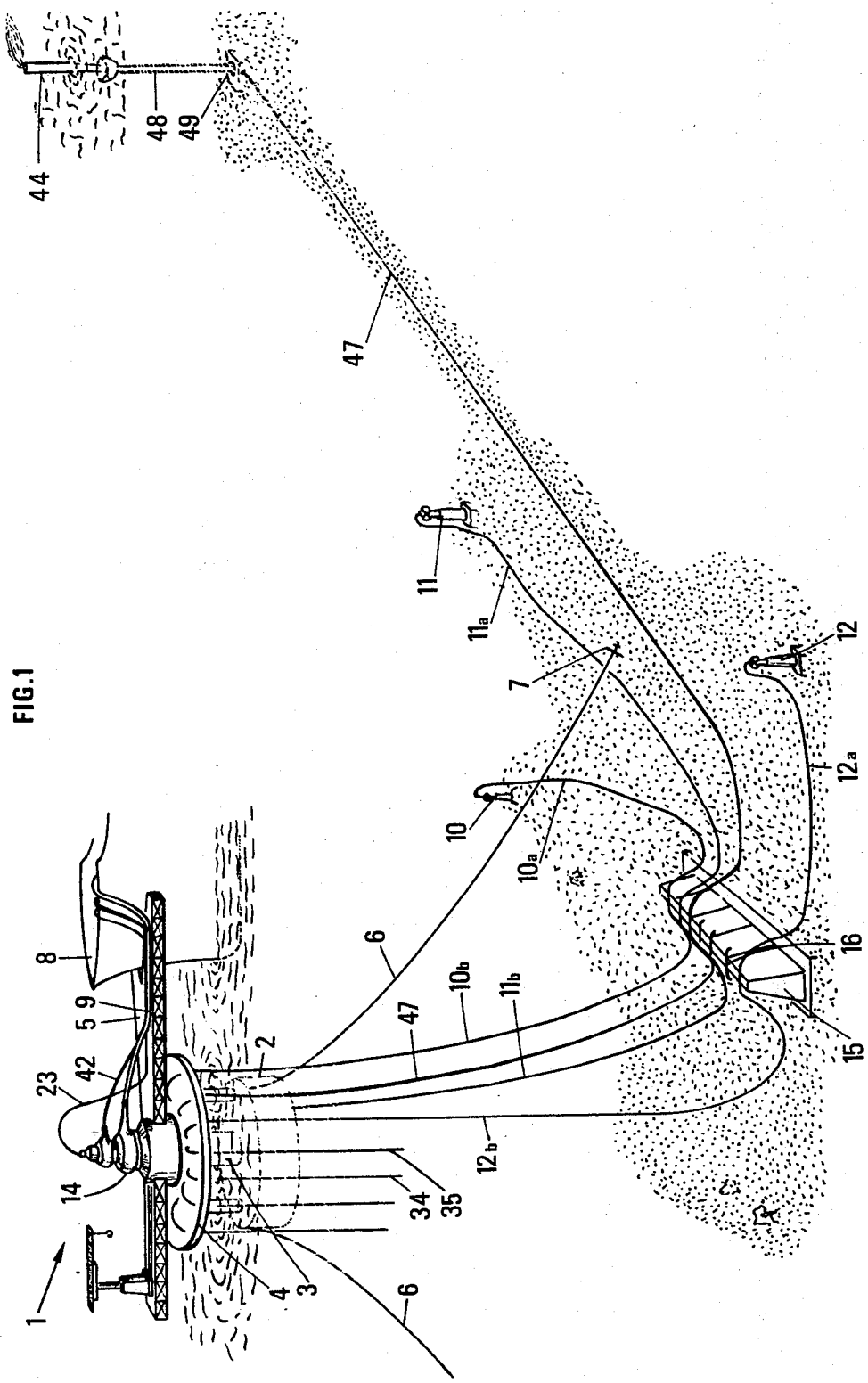

In the drawings reference numeral 1 designates as a whole a mooring station and transfer terminal comprising a watertight caisson immersed at a small depth, this caisson supporting through a column 3 a crown-shaped platform 4 whereon an arm 5 is rotatably mounted.

In the illustrated preferred embodiment, the water-tight caisson 2 is of positive buoyancy and is held in position through moorings 6 and anchors 7, but it would be possible, without departing from the scope of the invention, to secure the caisson 2 to the top of a structure such as, for example, by a pile 2a (FIG. 5) driven into the water bottom or resting on the water bottom through a base plate.

The rotatable arm 5 permits mooring of an oil tanker 8 and loading thereof with hydrocarbons through one or more flexible loading pipes 9 supported by the arm. These pipes can be connected through suitable means to the tanks of ship 8.

The different producing wellheads, such as 10, 11 and 12 are connected through flow lines 10a, 11a, 12a . . . and flexible risers 10b, 11b, 12b to a production manifold 13 (FIG. 2), inside caisson 2, which communicates with the flexible loading pipe 9 through a rotary coupling 14.

In the embodiment illustrated in FIG. 1, the flexible pipes 10a and 10b are locally supported, in the vicinity of the water bottom, by guide means comprising for example a support member 15 whereon are located guide elements 16 with curved rims limiting the bending stresses in the flexible pipes at this location.

As shown by FIG. 2, the production manifold 13 inside caisson 2 is connected to the different underwater production well-heads through risers 10b, 11b . . . etc. These risers drain the hydrocarbon production and enable T F L tools or instruments to be injected or forced by counterflow pumping.

The production manifold 13 is connected to the loading pipe 9 through rotary coupling 14 and conduit 18.

A flexible production riser, such as riser 10b is connected to manifold 13 through rigid conduits or tubular elements such as 10c, 10d, 10e and 10f (FIG. 2).

The radius of curvature of conduits such as 10c and 10e, as well as that of the rims of guide elements 16 located in the vicinity of the water bottom, is selected sufficient for avoiding jamming of special T F L tools or instruments (scraping tools, measuring instruments, for example) in these tubular connecting elements, or in pipelines such as 10b, 11b . . . . , 10a 11a . . . . .

To permit application of the T F L method the curved connecting conduits such as conduit 10e are tangentially connected to a plurality of rectilinear substantially vertical pipes 10g, 11g, 12g . . . . etc. corresponding to the different production wells, these different vertical pipes opening in a chamber 19 located above platform 4.

The curved connecting conduits further comprise valves 20 which are normally closed when the wells are producing and which are remotely actuated from the surface, together with the other valves of the installation, through a remote control and power line 21 supported by the rotatable arm and connected to a central station 22 wherefrom the different valves can be remotely controlled. The connection between this central station 22 and the valves has not been shown in FIG. 2, for sake of clarity of the drawing.

Without interrupting the production of the other wells whose T F L valves 20 remain closed, it is possible to introduce from the water surface into one of the wells a tool or instrument according to the T F L method, through a T F L servicing flexible pipe designated by reference 23 in the drawings.

This flexible pipe 23 is connected to a conduit 24 positioned along the axis of chamber 19, through a rotary coupling 25 and a connecting pipe 26 whose radius of curvature is sufficient to prevent any risk of jamming of the T F L tools or instruments.

The introduction of these tools or instruments into any of pipes 10g, 11g, 12g . . . . etc. corresponding to the selected well is achieved through a S-shaped conduit 27 forming a switch and connecting this pipe to the axial conduit 24, this conduit 27 being rotatably mounted about the axis of chamber 19.

Conduit 27 will be for example positioned by means of a motor 29 driving gears 30 and 31, electric or hydraulic power being supplied to this motor 29 from station 22 connected to this engine through line 32.

By remotely controlling from the water surface the rotation of conduit 27, through line 21, it will thus be possible to connect this conduit 27 to any one of the vertical pipes 10g, 11g, 12g . . . . etc., i.e. to select the well wherein T F L servicing is to be carried out.

In caisson 2 is also housed a second manifold 33 providing safety of the oil field and of the installation by enabling fluid to be injected from the water surface into the wells. This manifold 33 is connected to the different well heads through flexible pipelines 34, 35 . . . . etc. which are secured to manifold 33 by tubular connectors such as elements 36, 37 and by pipes such as line 38.

The flexible lines such as 34, 35 . . . . have two main functions which are familiar to those skilled in the art: first they are used as flowlines for the injected fluid, when T F L operations are performed, and then they can be used as safety pipes for the space surrounding the producing well. Connection of flexible lines 34, 35 . . . . to the different wellheads 10, 11 . . . . respectively is not illustrated in FIG. 1, for sake of clarity of the drawing.

Manifold 33 is connected, through a conduit 40 and a rotary coupling 41, to a safety flexible pipe 42 supported by the rotatable arm 5 (together with flexible loading pipe 9 and flexible circulation pipe 23), so as to permit injection of safety fluid from the water surface.

Caisson 2 houses a third manifold 43, whereby such of the above indicated pipes can be connected to a flare 44. Connection of these pipes to manifold 43 may for example be effected as diagrammatically shown in FIG. 2.

Connection of manifold 43 to flare 44 is provided through conduits 45 and 46 and flexible pipes 47 and 48, the latter being secured to a mooring mass 49.

Production manifold 13 is connected to flare manifold 43 through conduits such as 39.

Moreover, each well is separately connected to flare manifold 43 through a pipe 50.

For safety purposes two assemblies of conduits and flexible pipes 45 to 48 are used (only one assembly has been illustrated), each of these assemblies being of sufficient diameter to convey by itself, if necessary, the whole production of all the wellheads.

Thus each well is at the same time separately connected to production manifold 13, to T F L circulation and well-annular space safety manifold 33 and to flare manifold 43. The connecting pipes are of course equipped with manually operated or remotely controlled switching out valves, such as those diagrammatically shown in FIG. 2 for well 10, the other wells 11, 12 . . . . etc. being similarly connected to manifolds 13, 33 and 43.

Figure 4A:
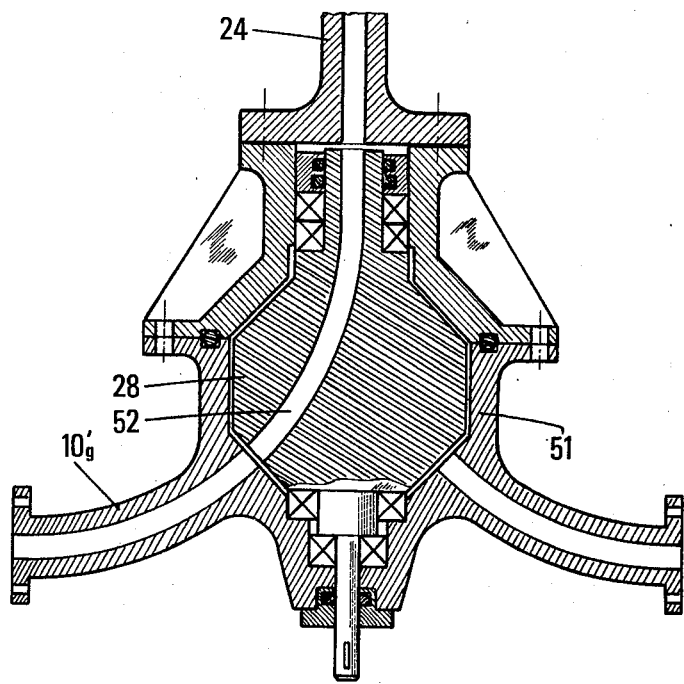
FIG. 4A illustrates the same rotatable drum in axial section.
Figure 4:
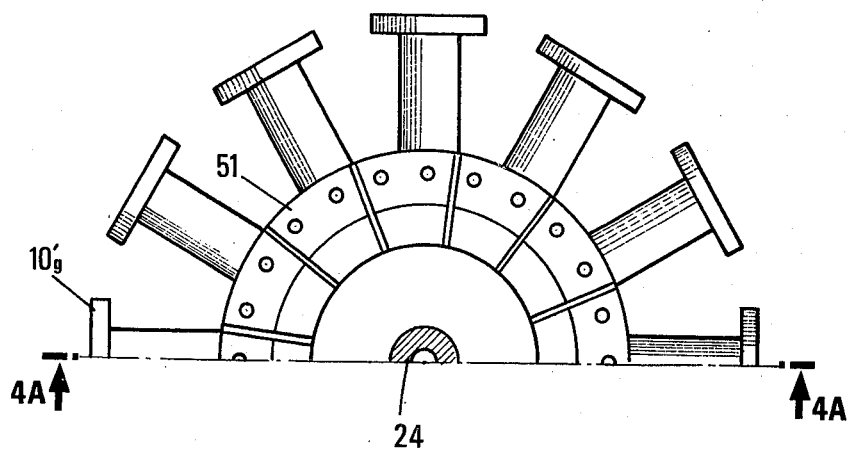
FIG. 4 is a half-view from above of an embodiment of this rotatable drum.

In the embodiment illustrated by FIGS. 3, 4 and 4A, the shunting or switching device in the caisson comprises a barrel 28 rotatably mounted in a housing 51. The opening of the T F L servicing conduit 24 into this housing is oriented along the axis thereof.

The barrel 28 is provided with an internal curved conduit 52 in extension of the T F L conduit 24. By rotating barrel 28, this conduit 24 can be connected to a conduit selected from a plurality of conduits, such as conduit 10'g, opening into housing 51 through a plurality of apertures distributed about the axis of this housing. These pipes are respectively connected on the one hand to the different wells through production and T F L-servicing flow lines such as 10a, 10b . . . . (FIG. 1) and through connecting conduits such as conduits 10c to 10f, and on the other hand, these pipes are connected to the production manifold 13. The barrel 28 is provided with positioning means which may be remotely controlled.

Such positioning means comprises, e.g., a motor 53, which may be connected to the central station 22 for remote control.

From the foregoing description, one skilled in the art can easily ascertain the essential characteristics of this invention, and without departing from the spirit and scope thereof, can make various changes and modifications of the invention to adapt it to various usages and conditions.

We claim:

1. A mooring station and transfer terminal for the production of hydrocarbons from a plurality of offshore underwater wells, said mooring station and transfer terminal comprising a watertight caisson having a rotatable arm above said watertight caisson, said arm supporting at least one loading pipe and at least one conduit means for introducing T F L instruments and tools, said watertight caisson comprising at least one production manifold means connecting said plurality of underwater wells to said at least one loading pipe, and at least one circulation and safety manifold means connecting said plurality of underwater wells to a circulation and safety pipe means supported at the surface of the water by said rotatable arm above said watertight caisson, said at least one production manifold means and said at least one circulation and safety manifold means each being equipped with valve means, said mooring station and transfer terminal further comprising switching means, capable of selectively connecting said at least one conduit means for introducing T F L instruments and tools with a pipe selected from a plurality of pipes for circulation and T F L servicing connecting every one of said plurality of underwater wells to said switching means and to said at least one production manifold means, said at least one production manifold means, and said at least one circulation and safety manifold means, and said switching means, each being connected to said plurality of underwater offshore wells through flexible pipelines.

2. A mooring station and transfer terminal according to claim 1, wherein said watertight caisson is supported by a structure which rests on the water bottom.

3. A mooring station and transfer terminal according to claim 1, wherein said watertight caisson is of positive buoyancy and is maintained at least partially submerged by anchoring means.

4. A mooring station and transfer terminal according to claim 1, wherein said watertight caisson is located in the vicinity of the water surface, said watertight caisson supporting an annular platform securing said flexible pipelines.

5. A mooring station and transfer terminal according to claim 1, wherein each of said plurality of pipes for circulation and servicing further comprises valve means for selectively connecting each of said plurality of underwater wells to said at least one production manifold means, said at least one safety manifold means or to said at least one flare manifold means.

6. A mooring station and transfer terminal according to claim 1, wherein said switching means comprises a barrel means rotatably mounted in a housing, said housing being connected to said at least one conduit means for introducing T F L instruments and tools, said housing comprising a plurality of openings connecting said housing with respective pipes selected from said plurality of pipes for circulation and T F L servicing.

7. A mooring station and transfer terminal according to claim 1, wherein said watertight caisson is positioned in the vicinity of the water surface, said watertight caisson supporting an annular platform securing said individual flexible pipelines.

8. A mooring station and transfer terminal according to claim 1, wherein said conduit means for introducing T F L instruments and tools is connected to said watertight caisson through a rotary coupling whose axis is aligned with the caisson axis at the top of the terminal.

9. A mooring station and transfer terminal according to claim 8, wherein said switching means carried by said watertight caisson comprises a rotatable switching means having an axis aligned with the axis of said rotary coupling.

10. A mooring station and transfer terminal according to claim 1, further comprising at least one flare located remotely from said terminal, wherein said watertight caisson further comprises at least one flare manifold means connected to said at least one flare through at least one flexible pipe.

11. A mooring station and transfer terminal according to claim 10, wherein each of said plurality of pipes for circulation and servicing further connects every one of said plurality of underwater wells to said at least one circulation and safety manifold means and to said at least one flare manifold means.

12. A mooring station and transfer terminal for the production of hydrocarbons from a plurality of offshore underwater wells, said mooring station and transfer terminal comprising a watertight caisson, a rotatable arm above said watertight caisson, said arm supporting at least one loading pipe, said watertight caisson housing at least one production manifold means connecting said plurality of underwater wells to said at least one loading pipe, and at least one circulation and safety manifold means connecting said plurality of underwater wells to a circulation and safety pipe means supported at the water surface by said rotatable arm above said watertight caisson, said at least one production manifold means and said at least one circulation and safety manifold means each being equipped with valve means, said at least one production manifold means, and said at least one circulation and safety manifold means each being connected to said plurality of underwater offshore wells through individual flexible pipelines.

* * * * *